United States Patent
Goel et al.

[11] Patent Number: 5,910,979
[45] Date of Patent: Jun. 8, 1999

[54] METHOD FOR BILLING LOCAL COMMUNICATION SERVICES PROVIDED BY AN INTEREXCHANGE COMMUNICATION NETWORK

[75] Inventors: Anurag Goel, Tinton Falls, N.J.; Eugene M. Kancianic, Easton, Pa.; Fermin D. Peinado, Freehold, N.J.

[73] Assignee: AT&T Corp., Middletown, N.J.

[21] Appl. No.: 08/954,652

[22] Filed: Oct. 20, 1997

[51] Int. Cl.[6] .............................. H04B 15/00; H04B 3/42
[52] U.S. Cl. ...................... 379/120; 375/115; 375/207; 375/221; 375/219
[58] Field of Search ...................... 379/112, 114, 379/115, 119, 121, 120, 125, 126, 127, 207, 219, 280, 221; 455/406, 418, 445

[56] References Cited

U.S. PATENT DOCUMENTS

| | | | |
|---|---|---|---|
| 5,476,749 | 12/1995 | Akinpelu et al. | 379/207 |
| 5,570,417 | 10/1996 | Byers | 379/115 |
| 5,661,792 | 8/1997 | Akinpelu et al. | 379/221 |

*Primary Examiner*—Paul Loomis

[57] ABSTRACT

A method is provided to distinguish local exchange communication services provided by an interexchange carrier from other services offered by the interexchange carrier. The local exchange service typically is provided to a customer with whom the interexchange carrier provides a direct connection. For each call, a terminating switch receives a code identifying a type of service assigned to the call. The code may contain a local service identifier associated with a call that identifies the call is identifying a type of service assigned to the call. The switch determines whether the call is a POTS call and whether the code includes the local service identifier. If both conditions are met, the terminating switch generates the billing record provided the customer is a subscriber to the local service offered by the carrier.

20 Claims, 5 Drawing Sheets

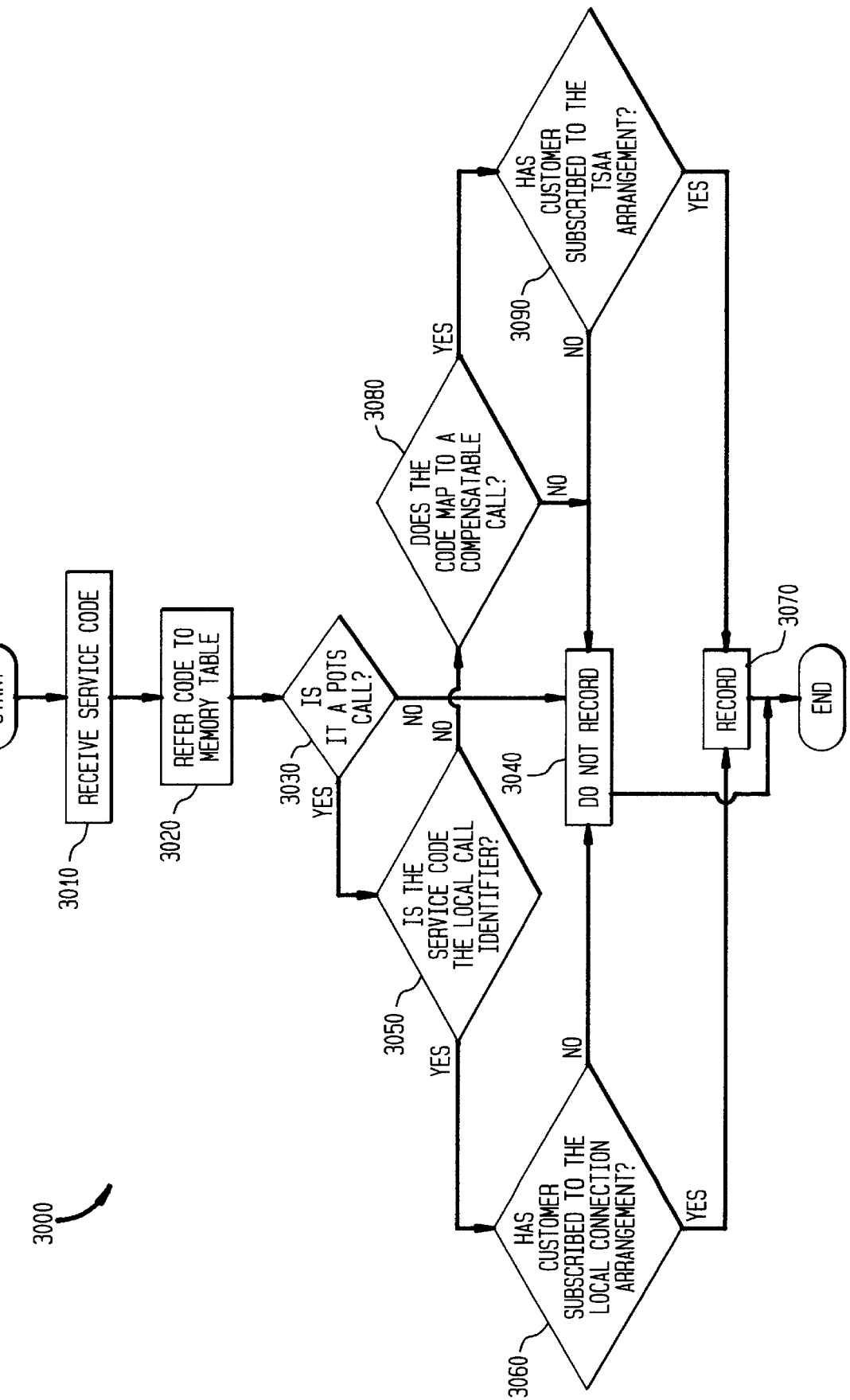

METHOD FOR BILLING LOCAL COMMUNICATION SERVICES PROVIDED BY AN INTEREXCHANGE COMMUNICATION NETWORK

BACKGROUND OF THE INVENTION

The present invention relates to a method of recording compensatable calls routed by an interexchange communication network directly to a called telephone subscriber under a local connection arrangement.

Traditional communication service is provided by an integrated communication network that includes several local exchange carriers ("LECS") and at least one inter exchange carrier ("IXC"). As the name implies, the inter exchange carrier provides long distance communication services interconnecting the various LECS.

Under the traditional telephone service, a customer's telephone connects to a LEC switch. The LEC provides regional, typically non-toll communication services to the customer (local calls). Long distance communication service traditionally is provided by the IXC by routing a call from a subscriber's originating LEC to a terminating LEC.

IXCS are beginning to provide alternate access for their larger customers. It is known for IXCS to provide direct connections to their larger customers. Typically, the direct connection is provided pursuant to some primary communication service to which the large customer has subscribed, such as 1-800 service. The local access arrangement is an auxiliary communication feature that uses excess capacity on the dedicated connection.

Under the local access arrangement, the IXC becomes a local service provider ("LSP") for the large customer. It completes local calls to the large customers. The IXC receives the local call in a variety of ways. For example, a first large customer may establish a local call with a second large customer, both of whom possess a direct connection with the IXC. Alternatively, if a LEC provides a "local number portability" feature, a smaller customer may be permitted to designate the IXC as a carrier of choice for local calls, compelling the LEC to forward the call to the IXC for completion. Other ways may exist.

For these local calls, the IXC and second customer act as a LEC to route calls. The IXC and second customer share a portion of the revenue that the LEC normally would receive. To accurately compensate the second customer for calls under the local access arrangement, the IXC must distinguish local access calls from calls routed to the customer under the primary service. No known system provides such a distinction.

Terminating service by alternate access ("TSAA") is another communication arrangement established between IXCS and their larger communication customers. As with the local access arrangement, the TSAA arrangement may be established when the IXC provides a dedicated physical connection from a terminating IXC communication switch directly to the communication equipment of the large customer. The TSAA arrangement is an auxiliary to some primary service.

A typical configuration for the TSAA arrangement is shown in FIG. 1. The large customer's equipment may be a private branch exchange ("PBX"). The PBX may connect to the terminating switch over, for example, a T1 trunk. For long distance calls placed to the large customer through the TSAA arrangement, the IXC routes the call to the customer's PBX over the dedicated trunk. Thus, under the TSAA arrangement, the customer acts as an access provider for itself. The IXC compensates the customer as such, the making the TSAA arrangement a revenue source for the customer.

Not all calls that are routed from an IXC terminating switch to the customer over the dedicated line are compensatable calls. Some are associated with the primary service. Accordingly, the terminating switch employs a method of discriminating compensatable calls from non-compensatable calls, shown in FIG. 2, to credit the TSAA access provider.

During call setup, the terminating switch communicates with other IXC switches in a call path between it and the originating subscriber. As part of call setup procedure for each long distance call in the IXC, the terminating switch receives a service code identifying a type of service or features associated with the call. The service code may indicate how the call is being billed; for example, whether the call is a traditional toll call (billed to the dialing subscriber), a collect call or a 1-800 call (these latter two being billed to the terminating subscriber). Further, the service code may indicate a grade of service for which that the customer has subscribed. In the communication networks maintained by the assignee, AT&T, the service code may be a service identity index ("SII") code.

Based on the service code, the terminating switch refers to a memory table (not shown) that associates the code with compensatable and non-compensatable events for the TSAA arrangement. The service code may indicate that some calls are not to be compensated under the TSAA arrangement. For example, terminating subscribers typically pay for routing of 1-800 calls over the direct trunk under a traditional service plan. The 1-800 calls cannot be credited under the TSAA arrangement.

If the service code does not disqualify the call as a non-compensatable event, the call is not necessarily compensatable. The terminating switch determines whether the call is a plain old telephone service ("POTS") call. Large purchasers of communication services often negotiate preferred rates of communication services due to the volume of communication services that they purchase. These are designated non-pots calls. The IXC service provider may disqualify the non-pots call from the TSAA arrangement. If the call is not a POTS call, the call is determined to be non-compensatable.

To determine whether the call is a POTS call, the terminating switch refers to common translations for the first six (6) digits of a dialed number/routing number associated with the call. The translations are provisioned earlier in the network to indicate whether the call is POTS or not. For example, as implemented by the assignee, a Called Handling Instruction ("CHI") indicator is a field populated in the translations. This field is pre-provisioned with different values, one of them representing a POTS call. The CHI value is derived during the digit translations.

If the call is a POTS call, the terminating switch determines whether the service code maps to a compensatable event. The service code maps to a non-compensatable event when it indicates that the call is routed to the large customer according to a primary service, such as the 1-800 service. Thus, the service code disqualifies the call from being compensatable under the TSAA arrangement.

Finally, the terminating switch determines whether the customer is a participant in the TSAA arrangement. Again, a memory table (not shown) identifies which customers are participant in the service.

If these three conditions are met, the terminating switch generates an automatic message accounting ("AMA") billing record (not shown). Once the call is answered, the terminating switch monitors call activity and records the call when the call terminates.

To implement the desired local access arrangement, the IXC must be able to distinguish local calls from calls to be routed to the customer pursuant to another service. The TSAA compensation system cannot identify local calls and, therefore, cannot distinguish compensatable from non-compensatable calls. Accordingly, there is a need in the art for a system that distinguishes local access calls from other calls routed by an IXC to customers over dedicated trunks for the purposes of compensation.

SUMMARY OF THE INVENTION

The present invention provides a method that distinguishes local connection calls provided by an IXC from calls associated with other IXC services. The local connection calls are routed to customers that are connected directly to the IXC. At a terminating switch in the IXC, the switch receives a code associated with calls handled by the switch that may contain a local call identifier indicating that the call is to be handled under the local connection arrangement. The switch determines whether the call is a POTS call and whether the code includes the local service identifier. If both conditions occur, the terminating switch generates a record for compensating the customer, provided that the customer is a subscriber to the local connection arrangement offered by the IXC.

BRIEF DESCRIPTION OF THE DRAWINGS

FIG. 5 illustrates a method of operation of the compensation system in accordance with a second embodiment of the present invention.

DETAILED DESCRIPTION

Figure 1:
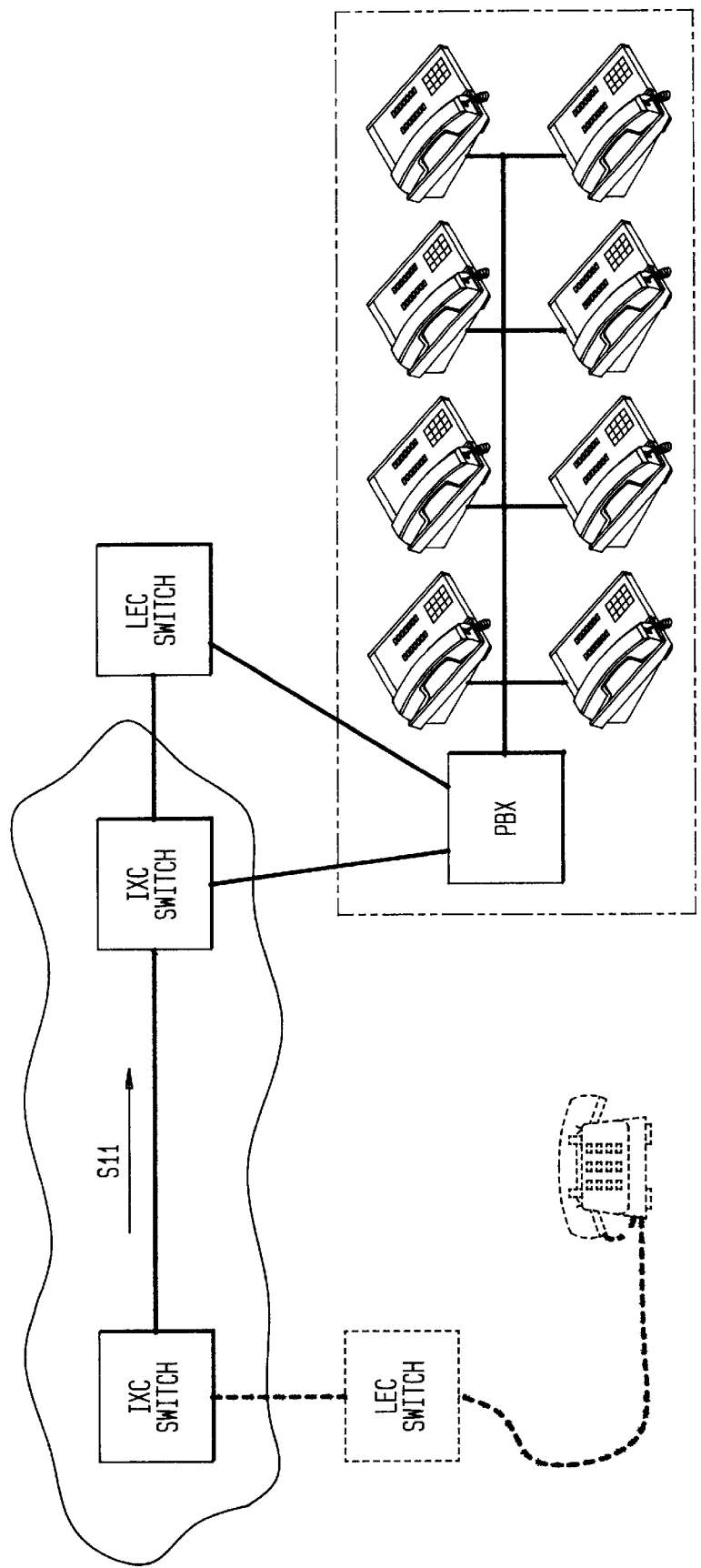
FIG. 1 illustrates an IXC network employing the TSAA arrangement.
Figure 2:
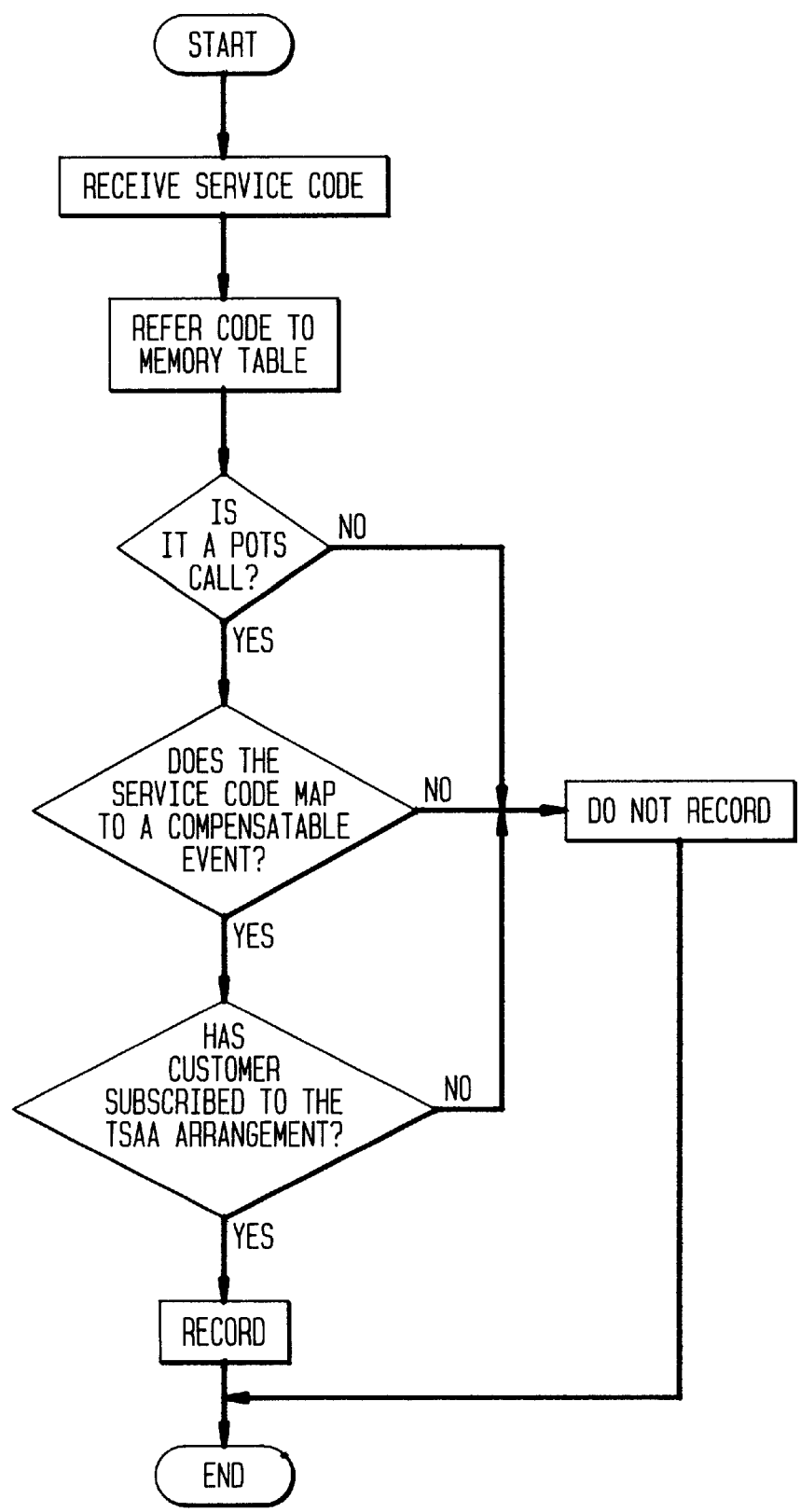
FIG. 2 illustrates a method of operation of the TSAA arrangement.
Figure 3:
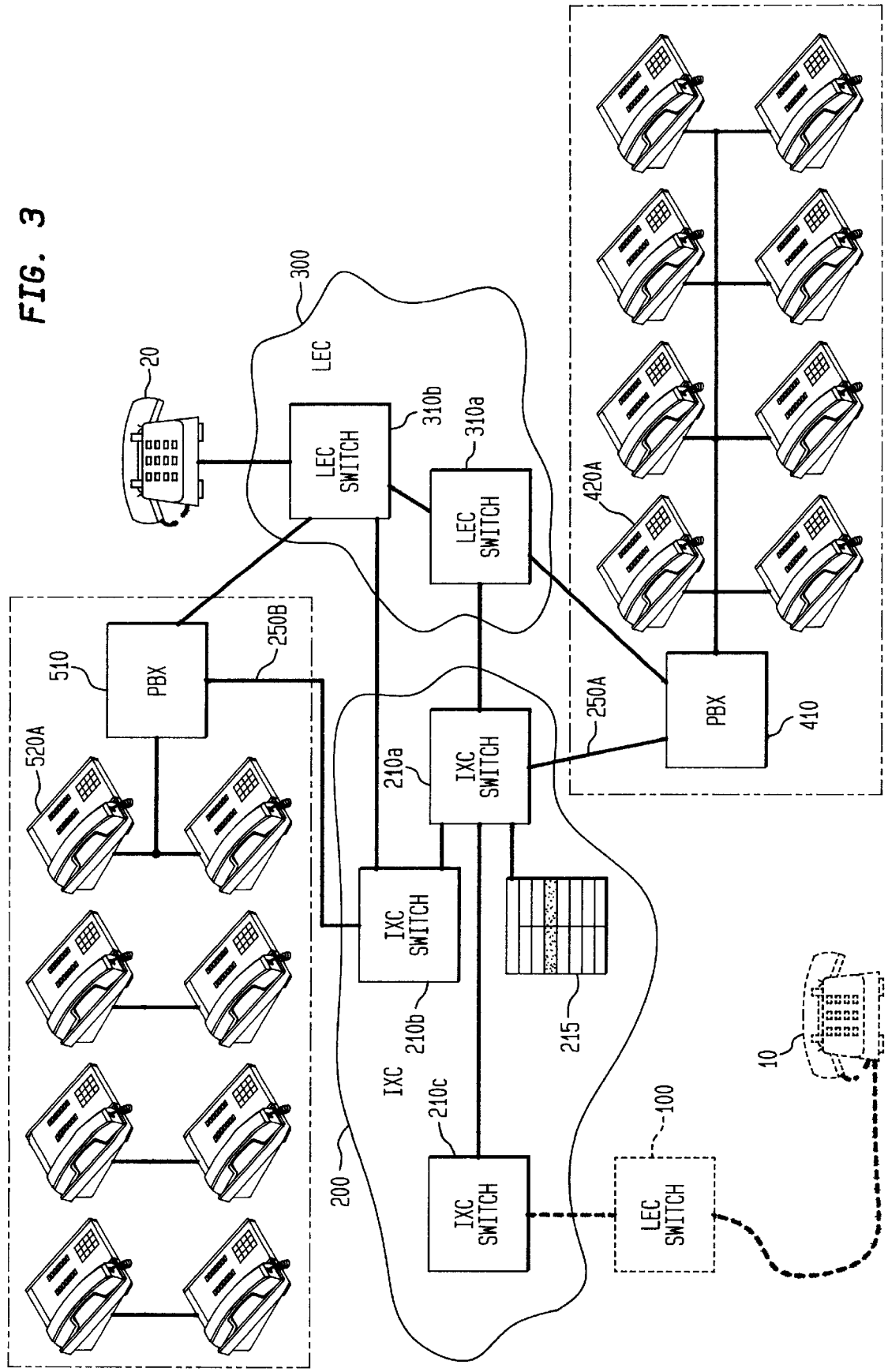
FIG. 3 illustrates an IXC network employing, in accordance with an embodiment of the present invention, a compensation system associated with the IXC's local connection arrangement.

Turning now to FIG. 3, there is shown a communication system employing a compensation system for the local communication arrangement provided by an IXC in accordance with an embodiment of the present invention. The IXC 200 is populated by a number of communication switches 210A–C, many of them provided in geographic proximity to one another. For example, in the illustration of FIG. 3, switches 210A and 210B may be provided within the same geographic region, such as the same metropolitan area. Conversely, switch 210C may be provided several thousand miles from switches 210A and 210B even though it is a member of the same IXC 200. IXC switches may be the model 4ESS™ communication switch, commercially available from Lucent Technologies of Murray Hill, N.J.

An IXC switch may connect directly to the communications equipment of its larger customers over dedicated trunk lines. In the illustration of FIG. 3, switch 210A connects to PBX 410 over dedicated trunk line 250A, switch 210B connects to PBX 510 over dedicated trunk line 250B. PBXs 410 and 510 may be connected respectively to LEC switches 310A and 310B over other trunk lines.

Under the local communication arrangement, the IXC 200 provides local telephone service as an alternative to the local communication services provided by the LEC 300 of the same geographic area. A customer at 420A may dial a telephone number associated with another subscriber, say at 520A. In response, PBX 410 signals the IXC 200 over the dedicated trunk 250A to establish the call connection. As part of the local communication arrangement, an originating IXC switch 210A establishes a call path through the IXC 200 from the originating PBX 410 to the terminating PBX 510. The switch 210B that provides the direct connection to the terminating PBX 510 is designated a "terminating switch."

The originating switch 210A may determine that a particular call is a local call according to the methods described in the co-pending patent application Ser. No. 08/787,421, entitled "Method and System for Providing Local Service to Nodal Customers," filed on Jan. 23, 1997 and assigned to the assignee of the present invention, the disclosure of which is incorporated herein by reference.

As part of call setup, the originating switch 210A signals the terminating switch 210B to identify the call as a "local call." In one embodiment, the originating switch generates a local call identification code in the place of the known service code field to identify the local call. The local call identification code takes on a value that no traditional service code could take so that the call cannot be associated with any traditional long distance service. The terminating switch is programmed to identify the local call identification code as a local call.

Figure 4:
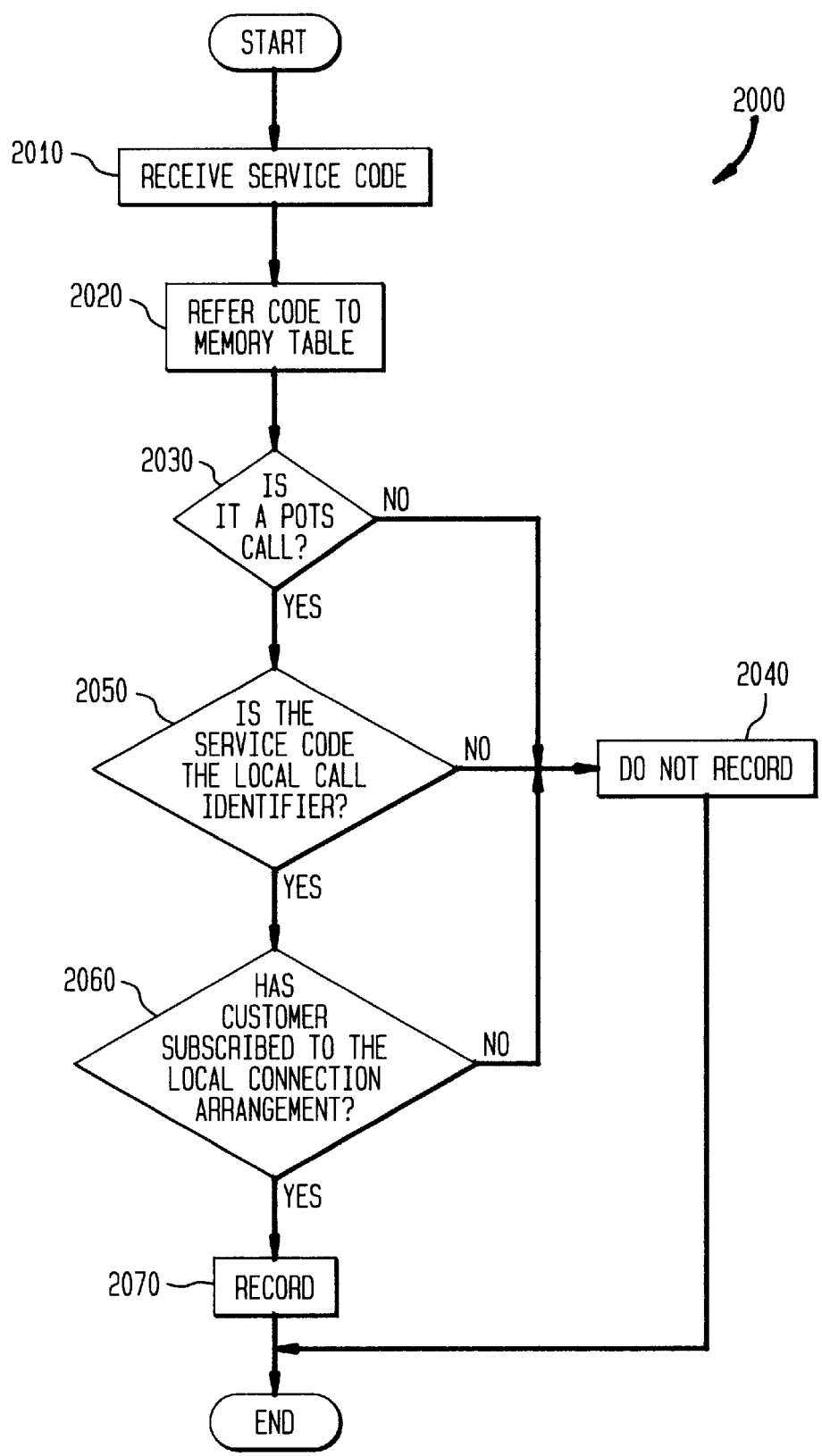
FIG. 4 illustrates a method of operation of the compensation system in accordance with a first embodiment of the present invention.

The terminating switch 210B employs the method 2000 of FIG. 4 to distinguish local calls from other types of calls to be routed to PBX 510. If the terminating switch 210B determines that the call is a local call, it generates a billing record representing it as such.

According to the method 3000, the terminating switch 210B receives a code in the service code field (Step 2010). The terminating switch 210B refers the code to a memory table 215B (Step 2020) and determines whether the call is a POTS call (Step 2030). If it is not a POTS call, the terminating switch does not create a billing record (Step 2040).

If the call is a traditional POTS call, the terminating switch 210B determines whether the code received in the service code field is the local call identifier (Step 2050). If it is not, if the service code field contains a traditional service code, the terminating switch 210B advances to step 2040 and does not create a billing record.

If the received service code is the local call identifier, the terminating switch 210B determines whether the customer subscribed to the local connection arrangement (Step 2060). If so, the terminating switch 210B generates the billing record. If not, the terminating switch 210B advances to step 2040.

The method of the present invention may be integrated with the method of recording compensatable events under the TSAA arrangement. The integrated method 3000 is shown in FIG. 5. According to this method, the terminating switch 210B receives the service code field as part of the call setup protocol (Step 3010). The terminating switch 210B refers the received code to the memory table 215 (Step 3020). The terminating switch 210B then determines whether the call is a POTS call (Step 3030). If not, it does not create a billing record (Step 3040) and terminates the method 3000.

If the call is a POTS call, the terminating switch 210B determines whether the code received in the service code position is the local service identifier (Step 3050). If so, the terminating switch 210B determines whether the customer is a subscriber to the IXC's local connection arrangement (Step 3060). It creates a billing record (Step 3070) if the customer is such a subscriber. Otherwise, the terminating switch 210B determines that no billing record is necessary (Step 3060) and terminates the method 3000.

If at step 3050 the terminating switch 210B determines that the received code is not the local service identifier, it determines whether the code maps to a compensatable event under the TSAA arrangement (Step 3080). If not, the terminating switch 210B advances to Step 3060. No billing record is generated.

If the received code maps to a compensatable event, the terminating switch determines whether the customer is a subscriber to the IXC's TSAA arrangement (Step 3090). If so, the terminating switch 210B advances to Step 3070 and generates a billing record representative of the call. Otherwise, the terminating switch 210B determines that no billing record is necessary (Step 3060) and terminates the method 3000.

The substantive information recorded in the billing record largely is determined by the proprietor of the IXC 200. However, where a terminating switch 210B supports both the local arrangement and the TSAA arrangement for a large volume customer, the billing record most likely will contain the local call identifier or the service code to permit the proprietor to distinguish among them at a later time. After all, compensation for the local arrangement and the TSAA arrangement may be different for any particular large volume customer.

Accordingly, the present invention provides a method for recording compensatable events associated with calls that are routed from an IXC to a large volume customer over dedicated direct communication links.

We claim:

1. In an interexchange communication network, a method for generating billing records associated with local communication service provided by the network that provides a direct communication connection with a customer, comprising the steps of:

receiving a code from the network, the code identifying a type of call to be placed to the customer, determining whether the call is a POTS call, when the call is a POTS call, determining whether the code includes a local service identifier, when the code includes the local service identifier, determining whether the customer has subscribed to the network's local communication service, when the customer has subscribed to the network's local communication service, generating the billing record.

2. The method of claim 1, further comprising a step of, when the call is not a POTS call, terminating the method without generating the billing record.

3. The method of claim 1, further comprising a step of, when the code does not include the local service identifier, terminating the method without generating the billing record.

4. The method of claim 1, further comprising a step of, when the customer has not subscribed to the IXC's local communication service, terminating the method without generating the billing record.

5. The method of claim 1, wherein the code containing the local service identifier is received in place of a service identity index code during call setup.

6. The method of claim 1, wherein the method is conducted by a terminating switch in the network, the terminating switch providing the direct communication connect to the customer.

7. In an interexchange communication network, a method for generating billing records associated with a local communication service provided by the network to a customer with whom the network possesses a direct communication connection, comprising the steps of:

receiving a code from the network, the code identifying a type of call to be placed to the customer, determining whether the call is a POTS call, when the call is a POTS call, determining whether the code includes a local service identifier, and when the code includes the local service identifier, generating the billing record.

8. The method of claim 7, further comprising a step of, when the call is not a POTS call, terminating the method without generating the billing record.

9. The method of claim 7, further comprising a step of, when the code does not include the local service identifier, terminating the method without generating the billing record.

10. The method of claim 7, further comprising a step of, when the customer has not subscribed to the IXC's local communication service, terminating the method without generating the billing record.

11. The method of claim 7, wherein the code containing the local service identifier is received in place of a service identity index code during call setup.

12. The method of claim 7, wherein the method is conducted by a terminating switch in the network, the terminating switch providing the direct communication connect to the customer.

13. In an interexchange communication network, a method for generating billing records associated with alternate access communication services provided by the network on behalf of customers with whom the network possesses a direct communication connection, comprising the steps of:

receiving a code from the network, the code identifying a type of call to be placed to the customer, determining whether the call is a POTS call, when the call is a POTS call, determining whether the code includes a local service identifier, when the code includes the local service identifier, determining whether the customer has subscribed to the network's local communication service, when the customer has subscribed to the network's local communication service, generating the billing record, when the code does not include the local service identifier, determining whether the code maps to a compensatable event, when the code maps to a compensatable event, determining whether the customer has subscriber to a terminating service alternate access service of the network, when the customer has subscribed to the terminating service alternate access, generating the billing record.

14. The method of claim 13, further comprising a step of, when the call is not a POTS call, terminating the method without generating the billing record.

15. The method of claim 13, further comprising a step of, when the code does not include the local service identifier, terminating the method without generating the billing record.

16. The method of claim 13, further comprising a step of, when the customer has not subscribed to the IXC's local communication service, terminating the method without generating the billing record.

17. The method of claim 13, further comprising a step of, when the code does not map to a compensatable event, terminating the method without generating the billing record.

18. The method of claim 13, further comprising a step of, when the customer has not subscribed to the terminating service alternate access, terminating the method without generating the billing record.

19. The method of claim 13, wherein the code is received in place of a service identity index code during call setup.

20. The method of claim 13, wherein the method is conducted by a terminating switch in the network, the terminating switch providing the direct communication connect to the customer.

* * * * *